Nov. 7, 1950  O. F. QUARTULLO  2,529,419
HORSESHOE
Filed Oct. 6, 1947

INVENTOR.
ORPHEUS F. QUARTULLO
BY
Oldham & Oldham
Attorneys

Patented Nov. 7, 1950

2,529,419

UNITED STATES PATENT OFFICE 2,529,419

HORSESHOE

Orpheus F. Quartullo, South Euclid, Ohio

Application October 6, 1947, Serial No. 778,209

1 Claim. (Cl. 168—25)

This invention relates to horseshoes, and, more particularly, is concerned with adjustably weighted horseshoes for controlling or assisting in the foot movement of show horses.

Heretofore, in the shoeing of show horses, it is very important that the weight of the shoes on the horse be distributed properly so that the show horse in going through its maneuvers before the judges will properly handle or to best advantage handle the movement of his feet. For example, if a horse tends to throw one foot or leg outwardly, it has been necessary heretofore to take off the shoe on that foot of the horse and to weld a piece of iron on the outside of the shoe which would tend to throw the horse's foot and hoof more inwardly. It has been my experience that this method of correcting or attempting to correct the foot movement of horses is a very unsatisfactory procedure. Often, a shoe on a horse is put on and taken off a number of times, more weight being added or being removed by a blacksmith in a very haphazard and uncertain fashion. Moreover, it is the welding on or removal of the weight, and this is an expensive and time consuming procedure.

It is the general object of my invention to avoid and overcome the foregoing and other difficulties of and objections to known horseshoes and shoe weighting practices, by the provision of a new and improved horseshoe which can be permanently secured to the horse's hoof and thereafter selectively weighted, or unweighted, to obtain the best possible movement of the horse's foot.

Another object of my invention is to provide a horseshoe having a plurality of cavities therein, at least certain of the cavities adapted to receive weighting material in selected and adjustable amounts, the cavities being removably closed by suitable means.

The foregoing objects of my invention, and other objects which will become apparent as the description proceeds, are achieved by the provision of a horseshoe having a plurality of cavities therein, removable weighting means at least partially filling selected cavities, and means removably closing at least the cavities having the weighting means therein.

For a better understanding of the invention, reference should be had to the accompanying drawings, wherein.

Figure 1:
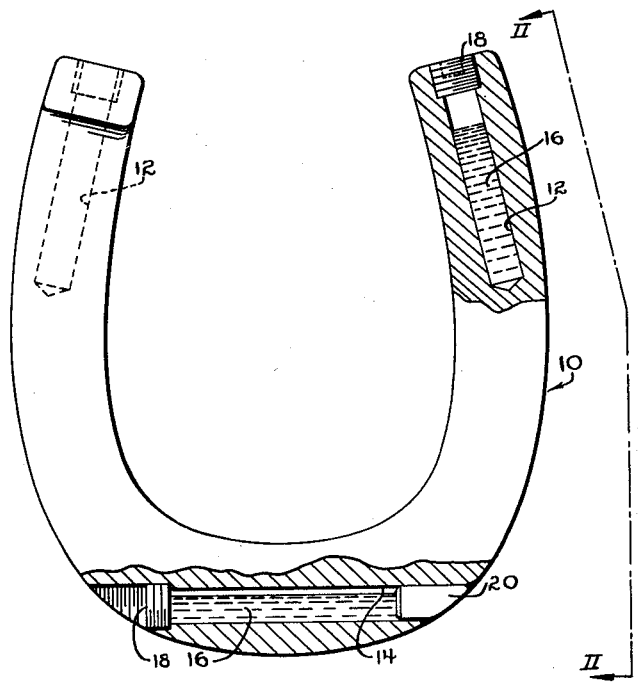
Fig. 1 is a plan view, partly broken away, of one embodiment of a horseshoe incorporating the principles of my invention.
Figure 2:
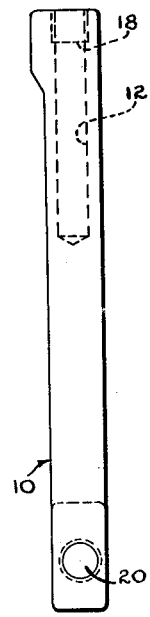
Fig. 2 is a side elevation taken substantially on line II—II of Fig. 1, and illustrating the horseshoe of Fig. 1.

Having reference to the form of the invention illustrated in Figs. 1 and 2 of the drawings, the numeral 10 indicates generally a horseshoe of substantially conventional character, except that I contemplate that the horseshoe may be made of slightly greater than usual thickness, and I also preferably employ a case hardened metal for the shoe so as to increase the resistance of the shoe to wear. Ordinary horseshoes made from mild steel and not subjected to careful heat treating or case hardening operations are relatively soft and wear out rapidly which fact becomes quite an annoyance and an expense.

In the horseshoe 10, I form or provide a plurality of cavities 12 and 14. As seen in the drawing, the cavities 12 are provided adjacent the heels of the horseshoe, while the cavity 14 is provided adjacent the toe of the shoe. At least certain of the cavities 12 and 14 are filled or partially filled with a weighting means, such means taking the form of lead shot, mercury, or other means which can be removably positioned in the cavities. In the drawings, the numeral 16 indicates a body of mercury employed as the weighting means.

The cavities 12 and 14 are removably closed by suitable means which may comprise screw threaded plugs 18 received in appropriately tapped ends of the cavities. The other end of the cavity 14 is permanently closed by a plug 20 which is welded into place.

The horseshoes illustrated in the drawings have been illustrated without nail holes, it being preferred to secure the horseshoes of my invention to the horse's hoof by adhesive means, all in accord with the teaching disclosed and claimed in my co-pending patent application, filed October 6, 1947, Serial No. 778,208, and entitled "Methods and Apparatus for Applying Horseshoes." However, it should be definitely understood that my improved horseshoes herein described can be secured in conventional manner by nails to a horse's hoof, it merely being necessary to exercise a small degree of care in providing the nail holes in the horseshoe so that such nail holes do not pierce into any of the cavities 12 or 14. Also, when nail holes are provided in the horseshoe, it may be advisable to position the cavities 12 and 14 a little more towards the edge of the horseshoe so as to provide more room for the nails.

Figure 3:
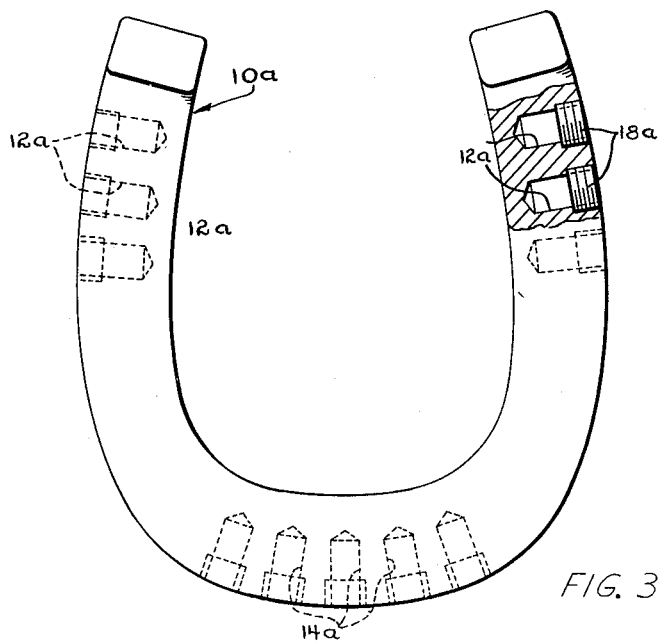
Fig. 3 is a view similar to Fig. 1 but illustrating another form of my invention.
Figure 4:
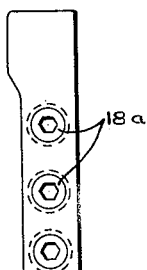
Fig. 4 is a view similar to Fig. 2 and illustrating a side elevation of a portion of the horseshoe shown in Fig. 3.

In the embodiment of my invention illustrated in Figs. 3 and 4 of the drawings, like numerals have been used for like parts, except that the suffix "a" has been added. For example, a horseshoe 10a, substantially as heretofore described, is provided with a plurality of cavities 12a adjacent the heels of the shoe, and a plurality of cavities 14a adjacent the toe of the shoe. The cavities 12a and 14a extend radially of the horseshoe in the manner illustrated, and each cavity, as before, is adapted to be removably closed by a screw-in plug 18 or other removable closure means. Although the drawings illustrate a space between the cavities 12a and the cavities 14a, it is to be specifically understood that radially positioned cavities may extend around the entire horseshoe without any gap between the cavities 14a and 12a. In any event, the cavities 12a and 14a are adapted to removably receive weighting material, in the manner heretofore described.

In the embodiment of the invention illustrated in Figs. 3 and 4, it will be recognized that the position of the cavities is such that nail holes can be readily provided between adjacent cavities.

In the use of horseshoes of the type herein described, it will be understood that before or after the horseshoe is applied to the horse's hoof, that it is a relatively simple matter to appropriately weight the horseshoe by filling or partially filling one or more of the cavities with a weighting material. If it should be found that too much weight has been placed in the shoe or in one part of the shoe, then the weight can be reduced merely by removing one or more of the plugs and removing some or all of the weighting material. On the other hand, if it is necessary to provide additional weight at one or more parts of the horseshoe in order to effect the best possible movement of the horse, then, again, it is a simple matter to add additional weight in certain portions only of the horseshoe, all without removing the horseshoe from the horse's hoof, and thereby greatly reducing the requirements and charges of a blacksmith.

From the foregoing, it will be evident that the various objects of the invention have been achieved by the provision of a relatively inexpensive, easily applied horseshoe which can be readily adjusted as to weight and the position of the weight.

While in accord with the patent statutes, at least one embodiment of the invention has been illustrated and described in detail, it is to be particularly understood that the invention is not limited thereto or thereby, but that the scope of the invention is defined in the appended claim.

I claim:

A horseshoe having a cavity extending into each heel end of the shoe and running lengthwise of the heel end of the shoe and a cavity extending from side to side at the toe end of the shoe, a plug permanently closing one end of the last-named cavity, removable weighting means at least partially filling selected cavities, and means removably closing at least the cavities having the weighting means therein.

ORPHEUS F. QUARTULLO.

REFERENCES CITED

The following references are of record in the file of this patent:

UNITED STATES PATENTS

| Number | Name | Date |
|---|---|---|
| 404,109 | Perry | May 28, 1889 |
| 415,735 | Reed | Nov. 26, 1889 |
| 425,474 | Van Etten | Apr. 15, 1890 |
| 470,400 | Perkins | Mar. 8, 1892 |
| 470,815 | Bartow | Mar. 15, 1892 |
| 522,288 | Clark | July 3, 1894 |
| 1,794,438 | Brenner | Mar. 3, 1931 |
| 1,794,535 | Osborne | Mar. 3, 1931 |
| 1,987,786 | Meisser | Jan. 15, 1935 |
| 2,320,310 | Stoddard | May 25, 1943 |
| 2,375,818 | Peters | May 15, 1945 |